Nov. 29, 1960 W. J. LEINBACH 2,962,301
TRACTOR-SEMI-TRAILER COMBINATION
Filed Oct. 15, 1958 2 Sheets-Sheet 1
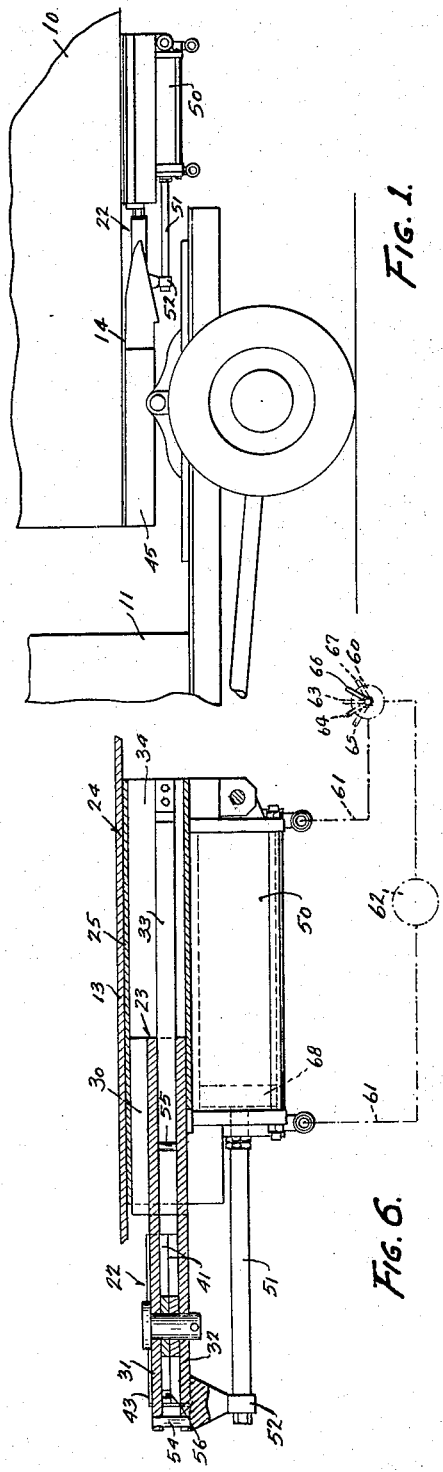
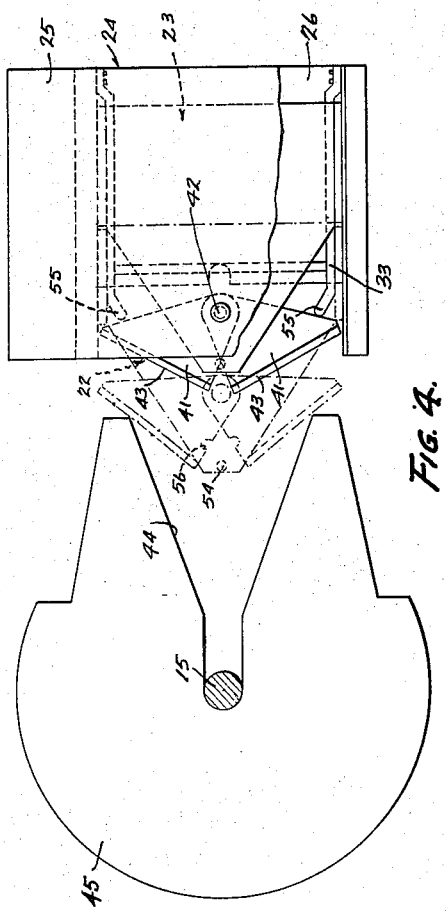
INVENTOR.
WALTER J. LEINBACH
BY
Bean, Brooks, Buckley & Bean.
ATTORNEYS Nov. 29, 1960 W. J. LEINBACH 2,962,301
TRACTOR-SEMI-TRAILER COMBINATION
Filed Oct. 15, 1958 2 Sheets-Sheet 2
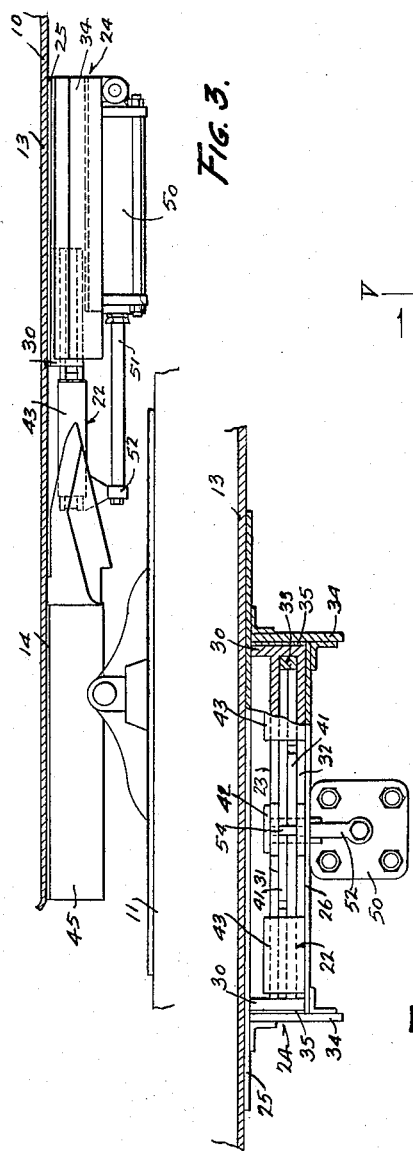
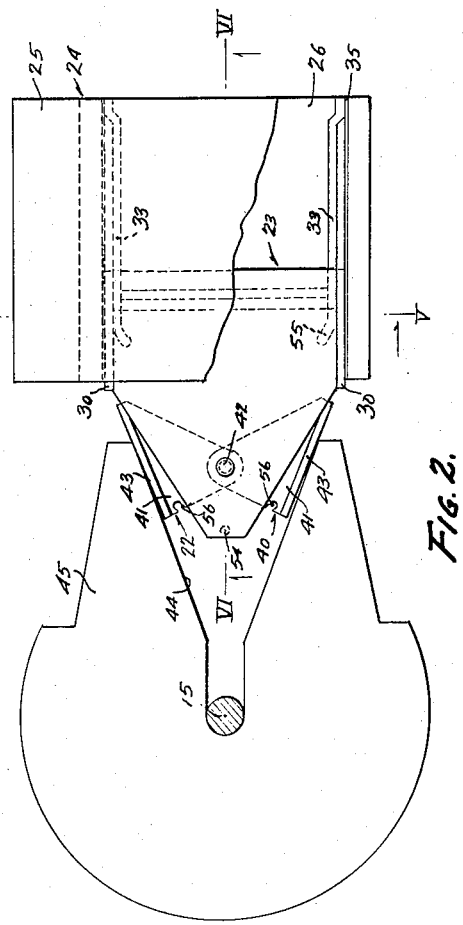
INVENTOR.
WALTER J. LEINBACH
BY
Bean, Brooks, Buckley & Bean.
ATTORNEYS United States Patent Office 2,962,301
Patented Nov. 29, 1960

2,962,301

TRACTOR-SEMI-TRAILER COMBINATION

Walter J. Leinbach, Dunkirk, N.Y.; Ruth Washington Pugh, executrix of said Walter J. Leinbach, deceased, assignor, by direct and mesne assignments, to Universal Stabilizer, Inc., Fredonia, N.Y., a corporation of New York Filed Oct. 15, 1958, Ser. No. 767,399

8 Claims. (Cl. 280—432)

My invention relates in general to tractor-semi-trailer combinations, and in particular to means for preventing the semi-trailer and tractor from jackknifing.

It is well known to those skilled in the art that when a tractor-semi-trailer combination is passing over slippery pavement or moving down grade on hills there is a tendency for the semi-trailer to swing about on its king pin toward and ahead of the tractor since the semi-trailer usually is heavier than the tractor unit. The resulting jackknifing frequently causes loss of life, property damage, and a loss of time and money in the trucking industry.

The principal object of my invention is to maintain the semi-trailer and the tractor unit in alignment under conditions which will prevent jackknifing.

Another object is to provide locking means between the semi-trailer and the tractor unit which may be actuated manually to lock the parts together at the will of the operator when adverse road conditions are encountered.

A further object is to provide such a device which shall be readily adapted for use in connection with the present day tractor-semi-trailer combinations.

Furthermore, it is an object to provide manual means for locking the semi-trailer and tractor in their operating positions and to actuate the locking means to such a position as to permit a limited amount of relative rotation of the semi-trailer and tractor.

Moreover, my fifth wheel locking means is comparatively simple in design, of durable construction, and readily serviced when necessary.

The above objects and advantages have been accomplished by the device shown in the accompanying drawings, of which:

Fig. 1 is a fragmentary side elevation of a tractor-semi-trailer combination embodying my invention;

Fig. 2 is a plan view of my invention with the semi-trailer bottom removed and portions of my invention broken away;

Fig. 3 is a side elevation of my invention in its fully engaged position;

Fig. 4 is a plan view, similar to Fig. 2 but with the parts of my invention shown in retracted position;

Fig. 5 is a front elevation of the device, portions thereof being broken away and shown in section; and, Fig. 6 is an enlarged longitudinal sectional view taken on line VI—VI of Fig. 2.

In carrying out my invention, I provide a wedge member 22 slidably mounted upon the semi-trailer 10 and engageable with the V-shaped slot 44 of the tractor 11. The tractor is pivotally united to the semi-trailer by means of the usual king pin 15. The wedge member comprises a ram 23 slidably mounted within a ram housing 24. This housing which is secured to the bottom 13 of the semi-trailer 10 is provided with spaced top and bottom plates 25 and 26, respectively. The ram is provided with ram runners 30 for engagement with the top and bottom plates of the housing. The ram is formed with spaced guide plates 31 and 32, and a ram guide 33 is carried by and secured to each of the side plates 34 of the housing. Each of these ram guides is disposed between the guide plates 31 and 32 and has bearing contact with the inside surfaces of ram runners 30. A gib 35 is preferably provided between each of the side plates 34 and the adjacent runner 30 of the ram.

Carried by the forward end of the ram 23 are two superimposed cams 40, each having a cam arm 41. These cam arms are superimposed and disposed in space between the top and bottom plates 31 and 32 of the ram. A pivot pin 42 carried by the ram plates passes through suitable apertures formed in the arms whereby the cams are pivotally secured to the ram. Each of the cams is formed with a cam face 43 which is wider than the thickness of the cam arm and which is designed to engage the V-shaped slot 44 of the lower fifth wheel 45 of the tractor when the wedge member 22 is in its engaged position. The upper fifth wheel which is carried by the semi-trailer is shown at 14.

In order to actuate the wedge member to and from its engaged position as shown in Fig. 2, I employ a fluid cylinder 50 which is secured to the bottom plate 26 of the housing. The piston 68 of the cylinder carries a piston rod 51 which extends forwardly and is secured to a cam lug 52 carried at the front end of the ram and secured to the lower plate 32 thereof. As shown in Fig. 4 the wedge member 22 is in its retracted position and the tractor will be free to rotate about the king pin 15 of the semi-trailer in the usual manner. When in this position the cam arms 41 will be brought against a cam stop pin 54 by engagement therewith of a slot 55 formed in the front end of each of the cam arms. Furthermore, when in this position the rear edge of the cam arms will engage with the forward ends 56 of the ram guides 33 whereby the wedge member will be firmly held in its inoperative position. When, however, need for locking the tractor and semi-trailer together presents itself, fluid under pressure is supplied to the rear end of the cylinder 50 by any suitable manually controlled means. As shown diagrammatically in Fig. 6 this manual control may comprise a four-way valve 60 connected in a fluid line 61 which is supplied with fluid under pressure by a compressor 62. Actuation of the valve 60 to supply fluid to the rear end of the cylinder will force the wedge member forwardly into locking position with the V-shaped slot 44 of the tractor and thus lock the tractor and semi-trailer together in such a manner as to prevent jackknifing.

In carrying out my invention, it is, however, desirable to bring the wedge to a number of partially engaged positions. For instance, the wedge may be partially actuated to a position where the tractor and semi-trailer cannot make a right-hand turn but will have sufficient limited rotative movement for normal straightaway driving. Furthermore, the wedge may be moved to a position of partial engagement, such as shown in dot and dash lines in Fig. 4, in which position the wedge will still permit normal straightaway driving but from which position in an emergency it may be quickly forced into locking position. Obviously, the control arm 66 of the valve 60 will be actuated to its first position shown by the broken line 63 to move the wedge to the first partially engaged position; to its second position indicated by valve arm position 64 for moving the wedge to its second position; and to its third position indicated by valve arm position 65 for moving the wedge to its fully locked engagement with the tractor fifth wheel. When it is desired to unlock the tractor and semi-trailer the wedge member is returned to its normal inactive position within the ram by reverse flow of fluid under pressure in the cylinder by the actuation of the valve to its reverse position indicated by the valve arm position 67 the normal valve arm position being indicated at 66.

The valve and cylinder are so designed that in either position pressure of the fluid will be applied to each side of the piston (not shown) whereby the piston rod and its connected parts will be firmly held against actuation by relative movement of the tractor or semi-trailer. The valve 60 of my invention is so designed that after being actuated to either of the wedge positions, a time delay mechanism (not shown) preferably incorporated in the valve is actuated to cause fluid under pressure to be discharged into the opposite end of the cylinder 50 against the reverse side of the piston 68 thereof to retain the same in its actuated position under fluid pressure. The compressor 62 and cylinder 50 are standard articles of manufacture, and will not, therefore, be described in detail.

While I have shown and described fluid means for actuating the wedge member, it is obvious that any suitable mechanical actuating means may be employed. These and other modifications may be made without departing from the spirit of my invention or the scope of the appended claims and I do not, therefore, wish to be limited to the exact embodiments herein shown and described, the form shown being merely a preferred embodiment thereof.

What is claimed is:

1. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram disposed in said casing and formed with runners slidably engageable with the top and bottom of said casing, cam means pivotally carried by said ram and engageable with the V-shaped slot of said fifth wheel, said cam means comprising two cam arms superimposed upon each other and independently pivoted, and means carried by said semi-trailer for actuating said cam means.

2. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram slidably carried by said casing and disposed between the top and bottom thereof, cam means pivotally carried by said ram and engageable with the V-shaped slot of said fifth wheel, said cam means comprising two cam arms superimposed upon each other and pivotally carried by said ram, and means carried by said semi-trailer for actuating said cam means.

3. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram slidably mounted between the top and bottom of said casing, said ram having spaced ram plates, cam means pivotally carried by said ram and engageable with the V-shaped slot of said fifth wheel, said cam means having two superimposed arms disposed between said ram plates, and means carried by said semi-trailer for actuating said cam means.

4. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram carried by said casing and formed with runners slidably engageable with the top and bottom of said casing, ram guides carried by said casing and slidably engageable with the inner faces of said runners, cam means carried by said ram and engageable with the V-shaped slot of the fifth wheel of said tractor, said cam means comprising two cam arms superimposed upon each other and pivotally carried by said ram, and means carried by said semi-trailer for actuating said cam means.

5. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram carried by said casing and formed with runners slidably engageable with the top and bottom of said casing, ram guides carried by said casing and slidably engageable with the inner faces of said runners, cam means carried by said ram and comprising two cam arms superimposed upon each other and pivotally carried by said ram, each cam arm having a cam face and engageable with the V-shaped slot of the fifth wheel of said tractor, and means carried by said semi-trailer for actuating said cam means.

6. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram slidably mounted between the top and bottom of said casing, said ram having spaced ram plates, cam means pivotally carried by said ram and engageable with the V-shaped slot of said fifth wheel, said cam means having two superimposed arms disposed between said ram plates, a stop pin carried by said guide plates and engageable with said cam arms when in their retracted positions, and means carried by said semi-trailer for actuating said cam means.

7. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram carried by said casing in spaced relation therewith, runners slidably engageable with the top and bottom of said casing, ram guides carried by said casing and slidably engaging the inner faces of said runners, cam means carried by said ram and engageable with the V-shaped slot of the fifth wheel of said tractor, said ram guides having inwardly bent ends engageable with said cam arms when in their retracted positions, and means carried by said semi-trailer actuating said cam means.

8. A tractor-semi-trailer combination, comprising a tractor and a semi-trailer, a fifth wheel carried by said tractor and formed with a V-shaped slot, a ram casing carried by said semi-trailer and formed with a top and a bottom in spaced relation with each other, a ram carried by said casing and formed with runners slidably engageable with the top and bottom of said casing, ram guides carried by said casing and slidably engageable with the inner faces of said runners and formed with inwardly bent ends, cam means carried by said ram and comprising two cam arms superimposed upon each other and pivotally carried by said ram, said cam means being engageable with the V-shaped slot of said fifth wheel; a stop pin carried by said guide plates, said stop pin and said bent ends being engageable with said cam arms when in their retracted positions, and means carried by said semi-trailer for actuating said cam means.

References Cited in the file of this patent

UNITED STATES PATENTS

| 2,188,727 | Soulis | Jan. 30, 1940 |
| 2,194,160 | Brewster | Mar. 19, 1940 |
| 2,468,705 | Price | Apr. 26, 1949 |
| 2,545,339 | Brewster | Mar. 13, 1951 |
| 2,714,017 | Mendez | July 26, 1955 |